Aug. 18, 1931.  E. T. ANDERSON  1,818,968
GAUGING APPARATUS
Filed Sept. 12, 1928  3 Sheets-Sheet 3
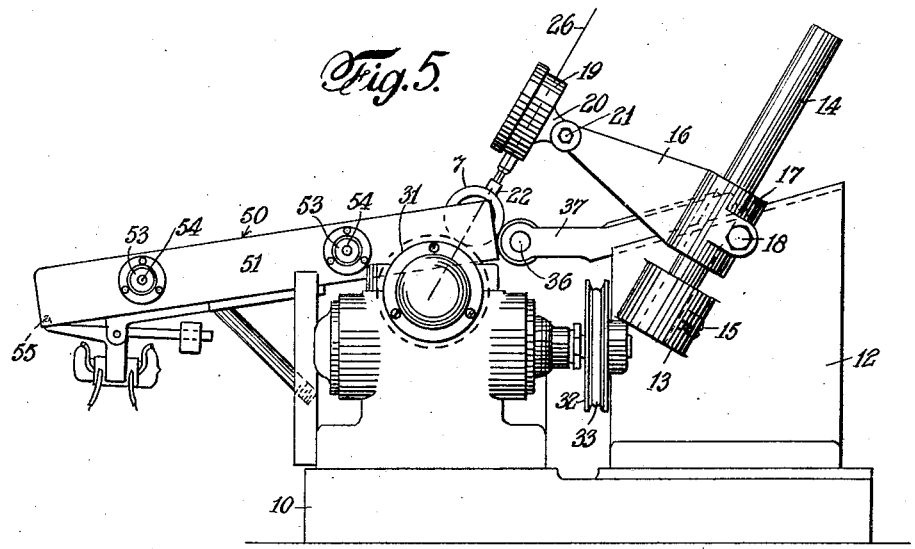
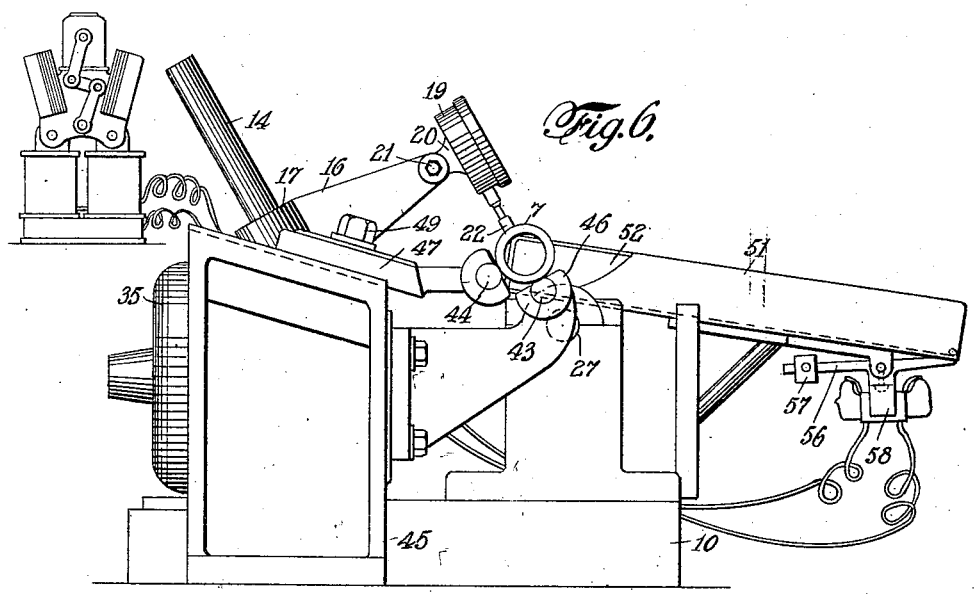
Inventor
Erick T. Anderson
By his Attorney Chas. Lyon Russell Patented Aug. 18, 1931

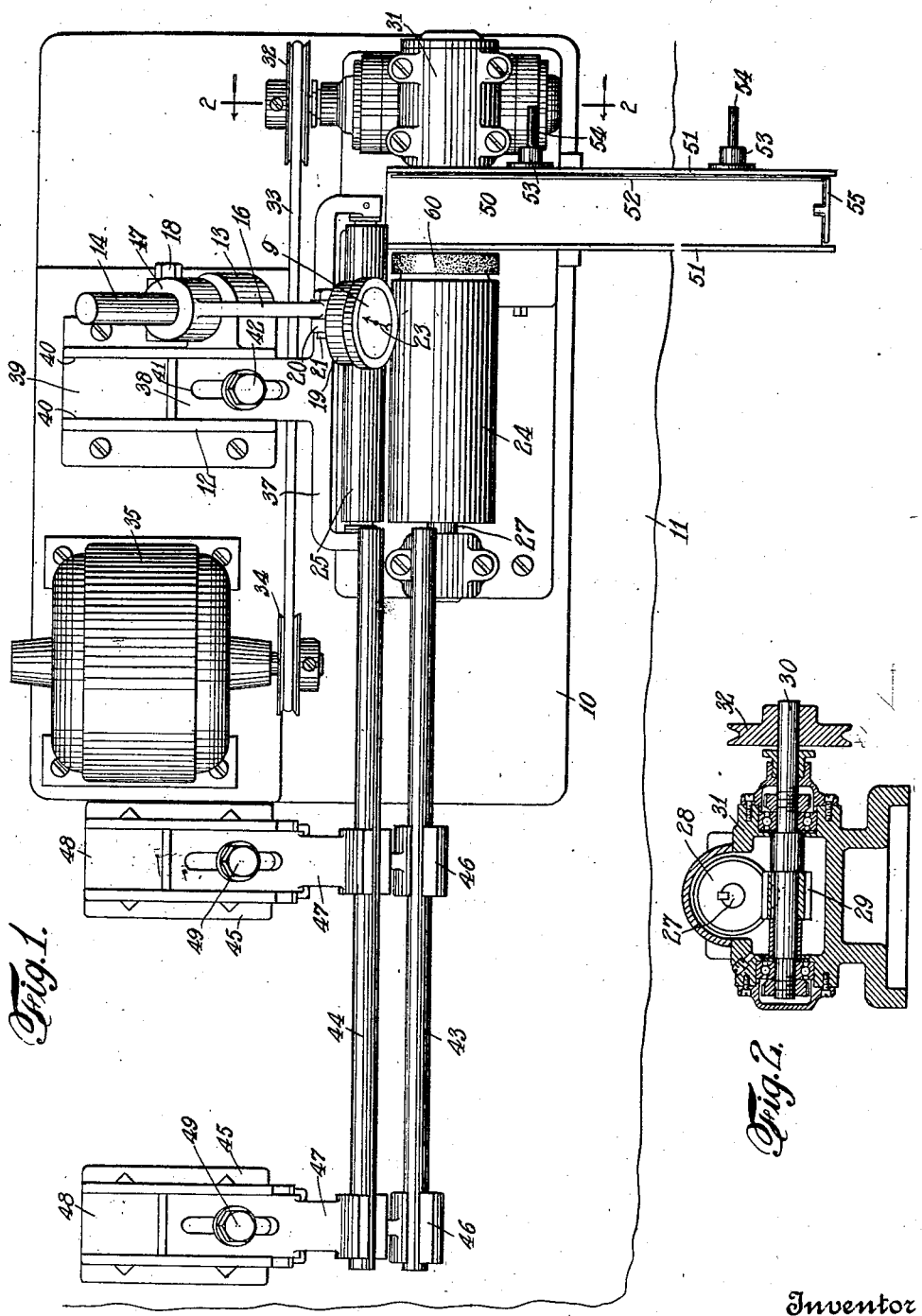

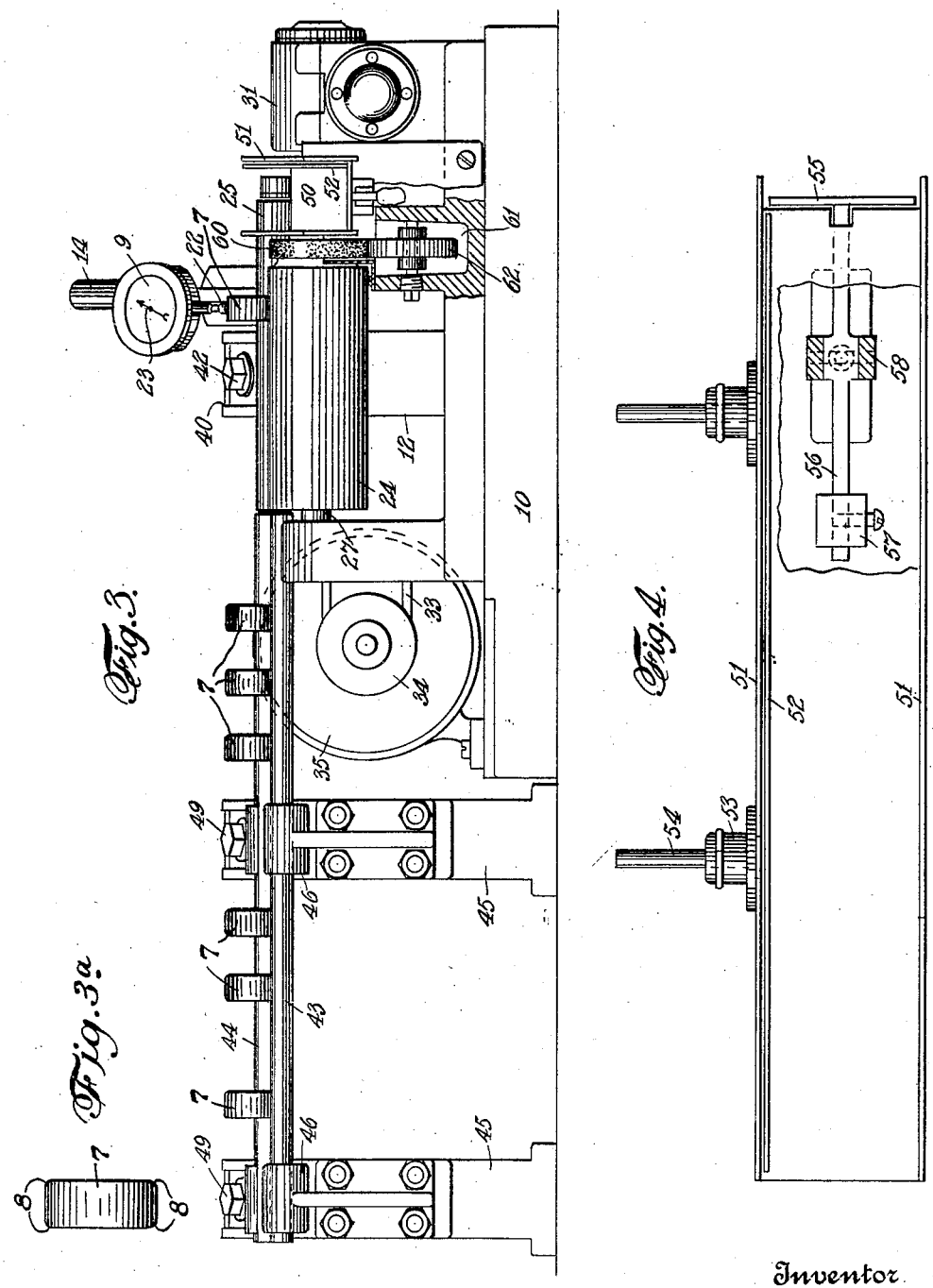

1,818,968

UNITED STATES PATENT OFFICE

ERICK TORVALD ANDERSON, OF HARTFORD, CONNECTICUT, ASSIGNOR TO THE SKAYEF BALL BEARING COMPANY, OF HARTFORD, CONNECTICUT, A CORPORATION OF CONNECTICUT

GAUGING APPARATUS

Application filed September 12, 1928. Serial No. 305,455.

The object of this invention is to provide mechanism for moving circular bodies in quantity, and passing each through a gauging device, particularly a gauge which will indicate the measurements of the various diameters of each piece. If the reading indicates that its various diameters are uniform, of course this will show that the piece is round or how far it departs from being round. And also will show whether it comes within the prescribed tolerances for the inspection.

In the drawings one practicable embodiment of the invention is illustrated, in which Figure 1 is a top view of the machine.

Fig. 2 is a section taken at a plane at about the line 2—2 of Figure 1, looking in the direction of the arrows.

Fig. 3 is a front elevation of the mechanism shown in Figure 1, and

Fig. 3a is an enlarged detail of a portion of the left-hand end of the mechanism shown in Fig. 3.

Fig. 4 is a top view of the discharge chute.

Fig. 5 is a view of the machine from the right-hand end of Figs. 1 and 3, and

Fig. 6 is a view of the machine from the left-hand end of Figs. 1 and 3.

The principal operation of the invention is to pass rings in quantity through the gauging or inspection operation, and cause each ring, while it passes through such gauging position, to rotate.

The illustrated embodiment of the invention was designed for gauging the outside diameters of the outer rings of annular ball bearings. These rings are preferably mounted on the feeding or loading bars 43 and 44, and it will be seen that they have a substantially cylindrical periphery 7, and by reference to the enlarged detail Fig. 3a that they are chamfered at 8 at each side. Maximum and minimum tolerances in the diameter of each particular size ring are established, and there is a maximum and minimum tolerance for the out of round condition of the ring.

The work of the machine is to move a series of such rings into the working point of the gauge or indicator 9, and by the reading upon its dial enable the inspector to determine whether each ring, as it passes through the inspection point, comes within the required tolerances.

The base 10 of the machine is intended to rest upon a suitable bench or table represented at 11 in broken lines.

At the rear of the machine there is adjustably mounted a standard 12 for supporting the indicator carrying mechanism. The standard 12 has a hub 13 formed upon it, such hub having a slanting bore which receives a removable pin 14, the pin being held in place by means of a set screw 15. This pin is for supporting the indicator carrier 16. The carrier 16 has a split hub 17 mounted on the pin 14. This simple construction permits moving the indicator toward and from the working position for adjusting it to accommodate rings of various diameters. It also permits a swinging movement for the purpose of adjusting the position of the indicator. After the carrier 16 has been adjusted in its proper position, it will be clamped by means of a clamping bolt 18. The casing 19 of the indicator has a rearwardly extending arm 20 which has a pivotal connection at 21 with the carrier 16. This pivotal connection preferably is provided by means of a set screw which will set the parts in their adjusted position. The work contacting portion 22 extends outwardly from the casing, and its movement in and out is magnified by proper mechanism and indicated by the pointer 23.

The ring being measured is indicated by the reference character 7, and is shown resting upon two rolls 24, 25, the roll 24 in the illustration being much larger than the roll 25, and being positively driven, may be termed the feed roll and the other the guide roll. In the preferred setting of the mechanism the movement out and in of the work contacting member 22 is on a line which substantially coincides with a radius of the larger positively driven feed roll 24, such line being indicated in Fig. 5 at line 26.

The shaft 27 of the roll 24 in mounted bearings supported by standards from the base plate 10, and is provided at one end with a worm wheel 28 meshing with a worm 29 carried on a worm shaft 30 mounted in suitable bearings within the housing 31. The shaft 30 is shown carrying a pulley 32 driven by means of a belt 33 from the pulley 34 of a suitable motor 35. By reference to Figs. 1, 2 and 3 and having in mind the customary practice of operating belt driven worm gearing, the upper run of the belt 33 is the active portion and is moving from right to left in Figs. 1 and 3, which causes the worm 29 to drive the roll 24, see Fig. 2, in a clockwise direction, the upper part of this roll in Fig. 7 moving toward the guide roll 25.

The guide roll 25 which, in the present instance, is an idler, has its shaft 36 mounted in the ends of a bracket 37, which bracket is adjustable so as to move the roll 25 toward and from the roll 24. As it moves away from the roll 24 for the purpose of accommodating the larger rings, it is also raised. The rear portion 38 of the bracket is shown mounted on the inclined upper surface 39 of the standard 12, and is guided in ways 40. An elongated slot 41 is formed in this rearward extension 38 for accommodating a set screw 42 for holding the roll 25 in its adjusted positions.

The shafts of the roll 24 and 25 are located in such relative angularity one to the other, spreading apart from left to right, that rings coming upon these rolls from the left-hand side of Figure 1 will travel toward the right and pass under the work contacting member 22. And then pass beyond the working point to a place where they may be discharged automatically. The angularity is preferably one quarter of one degree.

For economy and ease of adjustment the rolls 24 and 25 will not be long, although they will be long enough to accommodate several rings leading up to the working point. For speed of operation it is desirable to provide the inspector with the opportunity of placing a much larger number of rings in the machine and ready to be fed into it and preferably in the line of travel. To this end a pair of guide or loading rails 43, 44 have been provided. These guide rails are shown mounted upon brackets 45 which may be fastened to the base of the machine, or may be bolted directly to the table 11, as shown in the illustration. The rail 43 is shown mounted in supports 46 which are vertically adjustable on the brackets 45, and the rail 44 is mounted in carriers 47 which rest upon the slanting top faces 48 of the brackets 45, and are held in their adjusted position by means of set screws 49. Preferably the ring contacting surfaces of the loading rails 43, 44 are adjusted to correspond and be in line with the contacting surfaces of the rolls 24, 25.

For the purposes of the inspection to which this device is peculiarly adaptable, the rings will previously be washed or cleaned in some manner to remove all oil, and as the surface which is open to inspection is thus subject to rapid rusting if the articles are made of steel, means are provided for applying oil to the outer surfaces of the rings. At the discharge end of the roll 24 there is mounted an oil distributing roll 60 formed of felt. The rings pass over this feed roll 24 extending somewhat beyond the gauging point of the machine, and the oil applying device goes still further. The guide roll 25, however, extends beyond the end of this oil applying device and behind the opening to the chute 50, and assures the rings passing into the chute. Oil is supplied from a suitable reservoir 61 by means of an oil wheel 62 running in contact with the felt disc 60.

The loading rails 43 and 44 will be of a length suitable to accommodate the convenience of the inspector who may personally place the rings upon these rails or they may be placed there by an assistant. The rings will be fed forward in some suitable manner from the rails 43, 44 to the rolls 24, 25 and will pass from left to right through the inspecting zone of the machine, the rings moving forward and rotating so that each diameter of the ring passes under the head 22, enabling the inspector, by merely watching the indicating finger 23 of the dial, to tell whether the ring comes within the tolerances as to the maximum and minimum diameters, whether it comes within the tolerances of roundness, and whether it comes within the tolerances as to the relative diameters of its respective ends. In other words, if it is substantially cylindrical.

The discharge chute 50 is so arranged that it receives the rings as they are fed away from the gauge, and is preferably equipped with a unit counting mechanism. This chute 50 is shown slanting downwardly toward the front, and having upstanding sides 51. For the purpose of accommodating rings of different widths, and so that they may be held upright in running down the chute, an adjustable side 52 is provided which is capable of being moved sidewise by means of adjusting nuts 53 running upon screws 54. At the lower end of the chute 50 there is mounted a tripping device 55 which is shown in the form of a rod carried at the end of a lever 56 pivoted at the lower side of the chute 50. The other end of this lever has an adjustable counter weight 57. This lever 56 is connected with a mercury electrical circuit breaker 58 which in turn is intended to be connected with an electrically operated counter, a commercial form of such counter being illustrated conventionally at 59.

Although but one form of the invention has been shown in the drawings and particularly described, yet it will be obvious that this is the preferred form for certain applications of the invention and that changes in details of construction may be made within the scope of the claims without departing from the spirit of the invention.

Having described my invention, I claim and desire to secure by Letters Patent:

1. Mechanism for gauging rings, which comprises a pair of rolls adapted to support the rings, means for rotating one of such rolls to rotate the rings about their own axes, the rolls being adapted at the same time to move the rings axially, and a gauging device having a portion located in position for engaging the rings while they are so rotating and moving.

2. In a ring inspection device, the combination with a pair of rolls constructed and adapted for rotating and for axially moving the rings, means for rotating one of such rolls, means whereby the other roll may be adjusted toward and from this rotated roll and set in its position of adjustment, and a gauging device adjustable toward and from these rolls for engaging the rings as they pass under it.

3. In a ring inspection device, the combination with a pair of rolls for rotating and axially moving the rings, means for rotating one of such rolls, means whereby the other roll may be adjusted toward and from this rotated roll and set in its position of adjustment, and a gauging device adjustable toward and from these rolls for engaging the rings as they pass under it, the axes of said rolls being disposed at a slight angle one to the other whereby a spiral motion is imparted to the rings.

4. In an inspection device, the combination with a feed roll and means for rotating such roll, of a guide roll for supporting rings while being rotated by the feed roll, the axes of said rolls being disposed at a slight angle one to the other, whereby a spiral motion is imparted to the rings, and a gauging device having a member movable toward and from the rolls for engaging the rings as they pass under it.

5. The combination with a feed roll, having a surface capable of frictionally rotating circular bodies resting thereon, a guide roll at the rear of the feed roll for engaging such bodies, and capable of adjustment forwardly and backwardly, its movement being oblique so that as it moves backwardly it moves up, and as it moves forwardly it moves down, and an indicating device having a part for engaging a body located upon said rolls, and a carriage for the indicator capable of moving down and forwardly and up and backwardly.

6. The combination with a driven feed roll, having a surface capable of frictionally rotating circular bodies resting thereon, a guide roll at the rear of this driven roll for engaging such bodies, and capable of adjustment forwardly and backwardly, its movement being oblique so that as it moves backwardly it moves up, and as it moves forwardly it moves down, and an indicating device having a part for engaging a body located upon said rolls, and a carriage for the indicator capable of moving down and forwardly and up and backwardly, the work engaging portion of the indicator having a straight line movement and its carriage being so located that the line of indicator movement is on a radius of the driven roll.

7. In an inspection device, the combination with a feed roll for forwarding the rings, means for rotating such roll, of a roll adjustable toward and from the feed roll for guiding the rings while being rotated by the feed roll, the axes of said rolls being disposed at a slight angle one to the other, whereby a spiral motion is imparted to the rings, a gauging device adjustable toward and from these rolls for engaging the rings as they are moved under it, and a chute for receiving the rings as they pass from the feed roll, the guiding roll extending beyond the end of the feed roll at the mouth of the chute.

8. In an inspection device, the combination with a feed roll for forwarding the rings, means for rotating such roll, of a roll adjustable toward and from the feed roll for guiding the rings while being rotated by the feed roll, the axes of said rolls being disposed at a slight angle one to the other, whereby a spiral motion is imparted to the rings, a gauging device adjustable toward and from these rolls for engaging the rings as they are moved under it, a chute for receiving the rings as they pass from the feed roll, the guiding roll extending beyond the end of the feed roll at the mouth of the chute, and means located beyond the gauging point for oiling the rings.

9. In an inspection device, the combination with a feed roll for forwarding the rings, a guide roll for supporting the rings, the axes of said rolls being disposed at a slight angle one to the other, whereby a spiral motion is imparted to the rings, a gauging device located in position for engaging the rings while supported by said rolls, an oiling disc mounted on the discharge end of the feed roll and means for supplying this with oil, a chute for receiving the rings as they pass from the oiling device at the end of the feed roll, the guiding roll extending beyond the end of the feed roll at the mouth of the chute.

Signed at Hartford, Connecticut, this 6th day of Sept., 1928.

ERICK TORVALD ANDERSON.